(12) United States Patent
Kelley et al.

(10) Patent No.: US 6,601,088 B1
(45) Date of Patent: Jul. 29, 2003

(54) USER CONTROLLED E-MAIL DELETION

(75) Inventors: Edward E. Kelley, Wappingers Falls, NY (US); Norman J. Dauerer, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,270

(22) Filed: Jun. 23, 1999

(51) Int. Cl.[7] .............................................. G06F 13/00
(52) U.S. Cl. ...................................... 709/206; 713/201
(58) Field of Search ................................ 709/206, 204, 709/203; 713/201

(56) References Cited

U.S. PATENT DOCUMENTS

| | | | | |
|---|---|---|---|---|
| 5,278,955 A | * | 1/1994 | Forte et al. .................. | 709/206 |
| 5,757,669 A | | 5/1998 | Christie et al. ............. | 709/205 |
| 5,781,901 A | | 7/1998 | Kuzma ........................ | 707/10 |
| 5,786,817 A | | 7/1998 | Sakano et al. .............. | 345/619 |
| 6,154,764 A | * | 11/2000 | Nitta et al. .................. | 709/200 |
| 6,170,013 B1 | * | 1/2001 | Murata ........................ | 709/229 |
| 6,377,976 B1 | * | 4/2002 | Nitta et al. .................. | 709/204 |
| 6,385,644 B1 | * | 5/2002 | Devine et al. .............. | 709/206 |
| 6,430,598 B1 | * | 8/2002 | Dorrance et al. ........... | 709/203 |

* cited by examiner

*Primary Examiner*—Kenneth R. Coulter
(74) *Attorney, Agent, or Firm*—DeLio & Peterson, LLC; Kelly M. Reynolds; Steven Capella

(57) ABSTRACT

The present invention discloses a method and apparatus for a user, either an originator or a receiver of an e-mail message, to erase the e-mail message from all servers which routed the message when the e-mail message is erased from the user's client computer storage. By creating originator, server, and receiver delete tables, a pathway for a delete transaction containing the addresses of servers which routed the e-mail message enables the user, either an originator or receiver of the e-mail message, to sequentially delete the message along the pathway upon deletion from the client computer. Additionally, by inserting a deletion date into the header of the message, the message may be deleted from the client computer and all servers upon occurrence of the deletion date.

46 Claims, 8 Drawing Sheets

USER CONTROLLED E-MAIL DELETION

FIELD OF THE INVENTION

This invention is relates to a method and apparatus for deleting an e-mail message from a server when the e-mail message is deleted from a client computer. Deletion of the e-mail may be controlled by the user of the client computer.

BACKGROUND OF THE INVENTION

A user of a client computer may be one of many users which are part of a workgroup located on the same local area network (LAN) or may be linked to other users through one or more servers within a wide area network (WAN) or the Internet. Nowadays, e-mail messaging seems to be a preferred method of communication which transcends all physical boundaries. However, one of the difficulties in securing e-mail messages lies in the inability to completely erase an e-mail message once it has been sent.

When e-mail is sent from an originating client computer through a server, the e-mail message is broken into individual packets and each packet is routed through the server by way of routers. All of the packets from an individual e-mail message may not be sent to the same routers but may be sent to different routers. When the e-mail packets reach an interim destination, a gateway server, or a final destination server, the packets are put back together to re-create the original e-mail message. A gateway server is used to send the e-mail messages from one network to another network where the process of breaking the e-mail messages into individual packets and sending each packet to another set of routers is repeated. A final destination server is the last server to receive the individual packets. The final destination server re-creates them back into the original e-mail message and passes the e-mail message to the receiver client computer where it is copied onto the client's random access memory storage.

Once e-mail has been sent through a server, including the Internet, and even though the originator/sender and the recipient of the e-mail have both deleted it from their client or personal computers (PCs) or workstations, the e-mail may still exist on the servers that routed the e-mail. The delete requests issued by either the originators or recipients of the e-mail do not affect the servers that relay the e-mail messages. The result is that e-mail that the originators and recipients wish to destroy oftentimes remain intact on the server. Thus, it would be desirable to provide a method and apparatus for deleting e-mail messages on a client computer while also erasing it from all the servers which routed the message.

Bearing in mind the problems and deficiencies of the prior art, it is therefore an object of the present invention to provide a method and apparatus for deleting e-mail messages on a client computer and all the servers which routed the message.

It is another object of the present invention to provide a method and apparatus for deleting e-mail messages controlled by the originator of the e-mail message.

A further object of the invention is to provide a method and apparatus for deleting e-mail messages controlled by the recipient of the e-mail message.

It is yet another object of the present invention to provide a method and apparatus for automatically deleting e-mail messages from a client computer and all the servers which routed the message.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of deleting e-mail messages sent to and received by a computer linked to a network comprising the steps of: (a) deleting an e-mail message from a computer, the computer linked to a server path having at least one server which routes the e-mail message to the computer; (b) sending a delete transaction from the computer along the server path; (c) receiving the delete transaction at each server along the server path; and (d) executing the delete transaction by each server to delete the e-mail message sequentially along the server path.

In another aspect, the present invention is directed to a method of deleting an e-mail message from a server by an originator of the e-mail comprising the steps of: (a) deleting the e-mail message from the originator computer linked to a server path which routes the e-mail message from one or more servers to the originator computer, the e-mail message having incorporated within a delete transaction; (b) sending the delete transaction from the originator computer to the server path upon the occurrence of step (a); (c) receiving and executing the delete transaction by each server along the server path; and (d) deleting the email message sequentially along the server path. The method may further include the step of updating the originator delete table.

Preferably, in step (a) the originator computer maintains an originator delete table comprising an identifier for the e-mail message, and the address of a first server along the server path to which the e-mail message is sent such that upon deletion of the e-mail message, the originator delete table is updated and sends the delete transaction to the first server along the server path.

In another aspect, the present invention is directed to a method of deleting an e-mail message from a server by a receiver of the e-mail comprising the steps of: (a) deleting the e-mail message from a receiver computer linked to a server path which routes the e-mail message from one or more servers to the receiver computer, the e-mail message having incorporated within a delete transaction; (b) sending the delete transaction from the receiver computer to the server path upon the occurrence of step (a); (c) receiving and executing the delete transaction by each server along the server path; and (d) deleting the e-mail message sequentially along the server path.

Step (c) may further include the step of sending a delete transaction to a next server along the server path.

Preferably, in step (a) the receiver computer maintains a receiver delete table comprising an identifier for the e-mail message, and the address of a last server along the server path from which the e-mail message originates such that upon deletion of the e-mail message, the receiver delete table is updated and sends the delete transaction to the last server along the server path from which the e-mail message originates.

In another aspect, the present invention is directed to a method of deleting an e-mail message by a server along a server path comprising the steps of: (a) receiving, by the server, an e-mail message having a deletion date; (b) creating a server delete table with an identifier of the e-mail message, an address of a location from which the e-mail message was received along the server path, and an address of a location to which the e-mail message is sent along the server path upon receipt of the e-mail message; (c) deleting the e-mail message upon occurrence of the deletion date; and (d) updating the server delete table with an indicator indicating that the e-mail message has been deleted.

Preferably, the server comprises one of a plurality of servers along the server path and step (c) further includes the step of sending a delete transaction to the server from which the e-mail was received along the server path. Alternatively, the server comprises one of a plurality of servers along the server path and step (c) further includes the step of sending the delete transaction to the server to which the e-mail is sent to along the server path.

In another aspect, the present invention is directed to a method of creating and deleting e-mail comprising the steps of: (a) creating an e-mail message on a first client computer; (b) inserting a deletion date into a header of the e-mail message; (c) sending the e-mail message with the deletion date to one or more servers in a chain of gateway servers; (d) sending the e-mail message with the deletion date, by a gateway server, to a final destination server; (e) receiving the e-mail message with the deletion date, by a second client computer, from the final destination server; and (f) deleting the e-mail message with the deletion date such that upon deletion the e-mail message is deleted from all servers.

Preferably, step (f) comprises deleting, from the second client computer, the e-mail message with the deletion date such that upon deletion a delete transaction is sent from the second client computer to the final destination server sequentially to a first gateway server which received the e-mail message from the first client computer. Alternatively, step (f) comprises deleting, from the first client computer, the e-mail message with the deletion date from all servers by sending a delete transaction from the first client computer sequentially to all gateway servers and the final destination server.

In another aspect, the present invention is directed to a method of creating and utilizing an originator delete table comprising the steps of: (a) creating an e-mail message on a client computer; (b) creating an originator delete table on the client computer comprising an e-mail message identifier, an address of a location to which the e-mail message is to be sent; (c) updating the originator delete table when a delete transaction is sent from the client computer; and (d) indicating on the originator delete table that the e-mail message has been deleted. Preferably, in step (c) the delete transaction is sent from the client computer upon deleting the e-mail message from the client computer.

In another aspect, the present invention is directed to a method of creating and utilizing a receiver delete table comprising the steps of: (a) creating an e-mail message on an originator client computer; (b) sending the e-mail message to a receiver client computer; (c) creating a receiver delete table on the receiver client computer comprising an e-mail message identifier and an address of the server from which the e-mail message was sent from; (d) updating the receiver delete table when a delete transaction is sent from the receiver client computer; and (e) indicating on the receiver delete table that the e-mail message has been deleted. Preferably, in step (d) the delete transaction is sent from the receiver client computer upon deleting the e-mail message from the receiver client computer.

In a further aspect, the present invention is directed to a method of creating and utilizing a server delete table comprising the steps of: (a) providing a server linked to a receiver computer, an originator computer, or both; (b) creating a server delete table when a server has received or sent an e-mail message, the server delete table comprising an e-mail message identifier and an address of a server from which the e-mail message was sent from and an address of a server to which the e-mail message will be sent; (c) updating the server delete table when a delete transaction, received by the server, is from a receiver client or an originator client computer; and (d) indicating on the server delete table that the e-mail message has been deleted. Preferably, in step (c) the server stores a delete transaction and is adapted to update the server delete table upon occurrence of a deletion date listed in the delete transaction.

In a further aspect, the present invention is directed to an originator delete table comprising an e-mail message identifier and an address of a server to which an e-mail is adapted to be sent.

In a further aspect, the present invention is directed to a receiver delete table comprising an e-mail message identifier and an address of a server from which an e-mail is adapted to be sent from.

In a further aspect, the present invention is directed to a server delete table comprising an e-mail message identifier, an address of a server to which an e-mail message is adapted to be sent and an address of a server from which an e-mail is adapted to be sent from.

In a further aspect, the present invention is directed to a program storage device readable by a machine, tangibly embodying a program of instructions executable by the machine to perform method steps for a method of deleting e-mail messages sent to and received by a computer linked to a network, the method steps comprising; deleting an e-mail message from a computer, the computer linked to a server path which routes the e-mail message to the computer; sending a delete transaction from the computer to the server path; receiving and executing the delete transaction by each server along the server path; and deleting the e-mail message sequentially along the server path.

In a further aspect, the present invention is directed to a program storage device readable by a machine, tangibly embodying a program of instructions executable by the machine to perform method steps for a method of deleting an e-mail message from a server by an originator of the e-mail, the method steps comprising; deleting the e-mail message from the originator computer linked to a server path which routes the e-mail message from one or more servers to the originator computer, the e-mail message having incorporated within a delete transaction; sending the delete transaction from the originator computer to the server path upon the occurrence of step (a); receiving and executing the delete transaction by each server along the server path; and deleting the e-mail message sequentially along the server path.

In a further aspect, the present invention is directed to a program storage device readable by a machine, tangibly embodying a program of instruction executable by the machine to perform method steps for a method of deleting an e-mail message from a server by a receiver of the e-mail, the method steps comprising: deleting the e-mail message from a receiver computer linked to a server path which routes the e-mail message from one or more servers to the receiver computer, the e-mail message having incorporated within a delete transaction; sending the delete transaction from the receiver computer to the server path upon the occurrence of step (a); receiving and executing the delete transaction by each server along the server path; and deleting the e-mail message sequentially along the server path.

In a further aspect, the present invention is directed to a program storage device readable by a machine, tangibly embodying a program of instruction executable by the machine to perform method steps for a method of deleting an e-mail message by a server along a server path, the method steps comprising receiving, by the server, an e-mail message having a deletion date; creating a server delete table with an identifier of the e-mail message, an address of a location from which the e-mail message was received along the server path, and an address of a location to which the e-mail message is sent along the server path upon receipt of the e-mail message; deleting the e-mail message upon occurrence of the deletion date; and updating the server delete table with an indicator indicating that the e-mail message has been deleted.

In a further aspect, the present invention is directed to a program storage device readable by a machine, tangibly embodying a program of instruction executable by the machine to perform method steps for a method of creating and deleting e-mail, the method steps comprising: creating an e-mail message on a first client computer; inserting a deletion date into a header of the e-mail message; sending the e-mail message with the deletion date to one or more servers in a chain of gateway servers; sending the e-mail message with the deletion date, by a gateway server, to a final destination server; receiving the e-mail message with the deletion date, by a second client computer, from the final destination server; and deleting the e-mail message with the deletion date such that upon deletion the e-mail message is deleted from all servers.

In a further aspect, the present invention is directed to a program storage device readable by a machine, tangibly embodying a program of instruction executable by the machine to perform method steps for a method of creating and utilizing an originator delete table, the method steps comprising: creating an e-mail message on a client computer; creating an originator delete table on the client computer comprising an e-mail message identifier, an address of a location to which the e-mail message is to be sent; updating the originator delete table when a delete transaction is sent from the client computer; and indicating on the originator delete table that the e-mail message has been deleted.

In a further aspect, the present invention is directed to a program storage device readable by a machine, tangibly embodying a program of instruction executable by the machine to perform method steps for a method of creating and utilizing a receiver delete table, the method steps comprising creating an e-mail message on an originator client computer; sending the e-mail message to a receiver client computer; creating a receiver delete table on the receiver client computer comprising an e-mail message identifier and an address of the server from which the e-mail message was sent from; updating the receiver delete table when a delete transaction is sent from the receiver client computer; and indicating on the receiver delete table that the e-mail message has been deleted.

In a further aspect, the present invention is directed to a program storage device readable by a machine, tangibly embodying a program of instruction executable by the machine to perform method steps for a method of creating and utilizing a server delete table, the method steps comprising: providing a server linked to a receiver computer, an originator computer, or both; creating a server delete table when a server has received or sent an e-mail message, the server delete table comprising an e-mail message identifier and an address of a server from which the e-mail message was sent from and an address of a server to which the e-mail message will be sent; updating the server delete table when a delete transaction, received by the server, is from a receiver client or an originator client computer; indicating on the server delete table that the e-mail message has been deleted.

The present invention is also directed to a program storage device readable by a machine having access to a delete table, the delete table comprising an e-mail message identifier, an address of a server to which an e-mail message is adapted to be sent and an address of a server from which an e-mail is adapted to be sent from, tangibly embodying a program of instructions to perform method steps for a method of deleting an e-mail message, the method comprising the steps of: checking the delete table for the e-mail message identifier after receiving instructions from a user to delete an e-mail message having the message identifier; locating the message identifier in the delete table; deleting the message identifier from the delete table; deleting the e-mail message from the machine; and sending a delete transaction from the machine to all addresses on the delete table for the e-mail message. Preferably, the program of instructions to perform method steps for a method of deleting an e-mail message further includes the step of indicating on the delete table that the e-mail message has been deleted.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
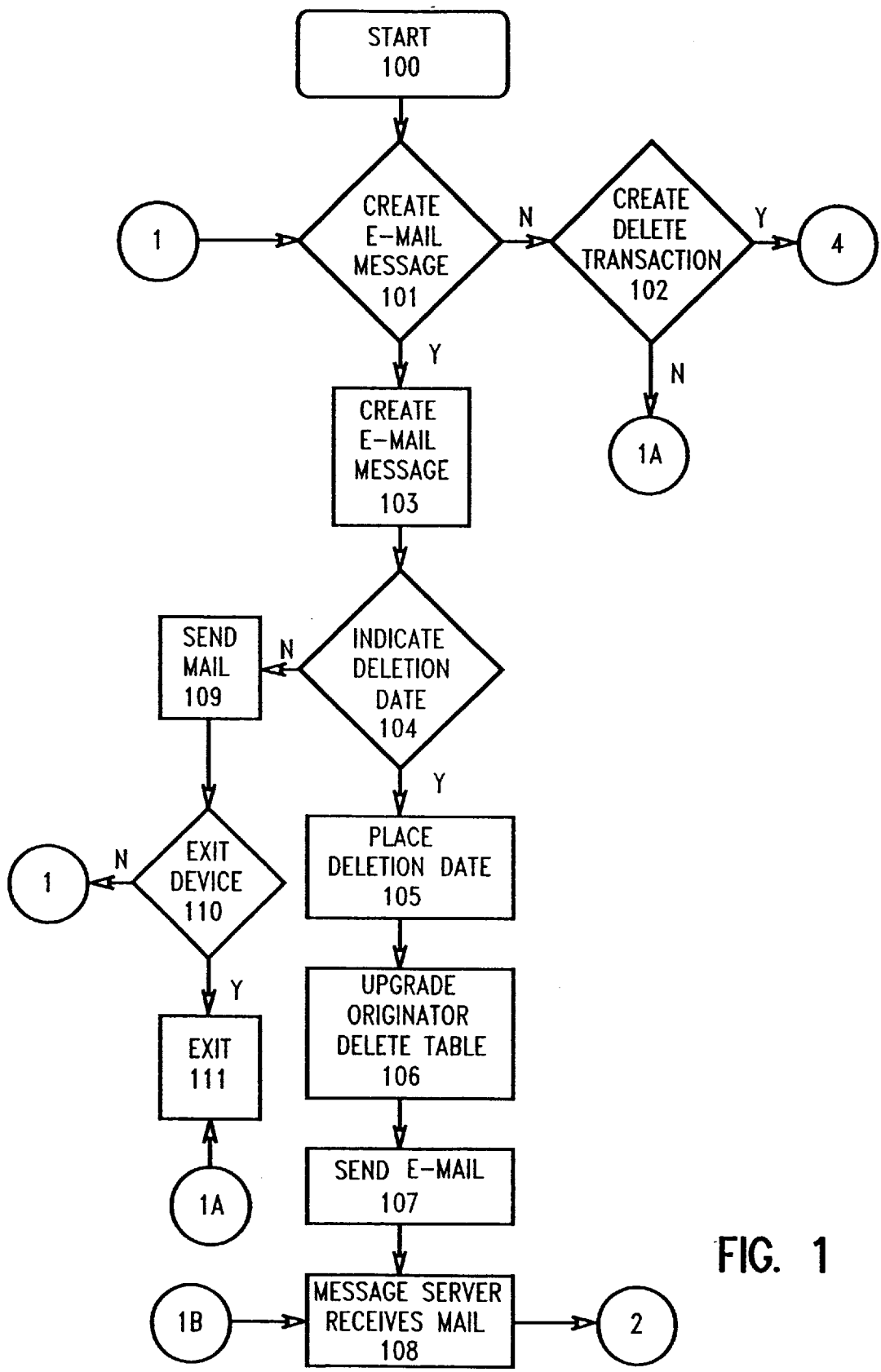
FIG. 1 is a flow diagram illustrating the method of creating an e-mail message in accordance with a method of the present invention.

In describing the preferred embodiment of the present invention, reference will be made herein to FIGS. 1–9 of the drawings in which like numerals refer to like features of the invention. Features of the invention are not necessarily shown to scale in the drawings.

The present invention provides the ability for a user, either an originator or a receiver, to erase an e-mail message from all servers when the e-mail message is erased from the user's client computer storage. The present invention also provides the ability for automatic deletion of an e-mail message from the user's client computer and all servers which routed the message either from or to a location by inserting a deletion date into the header of the message.

Figure 2:
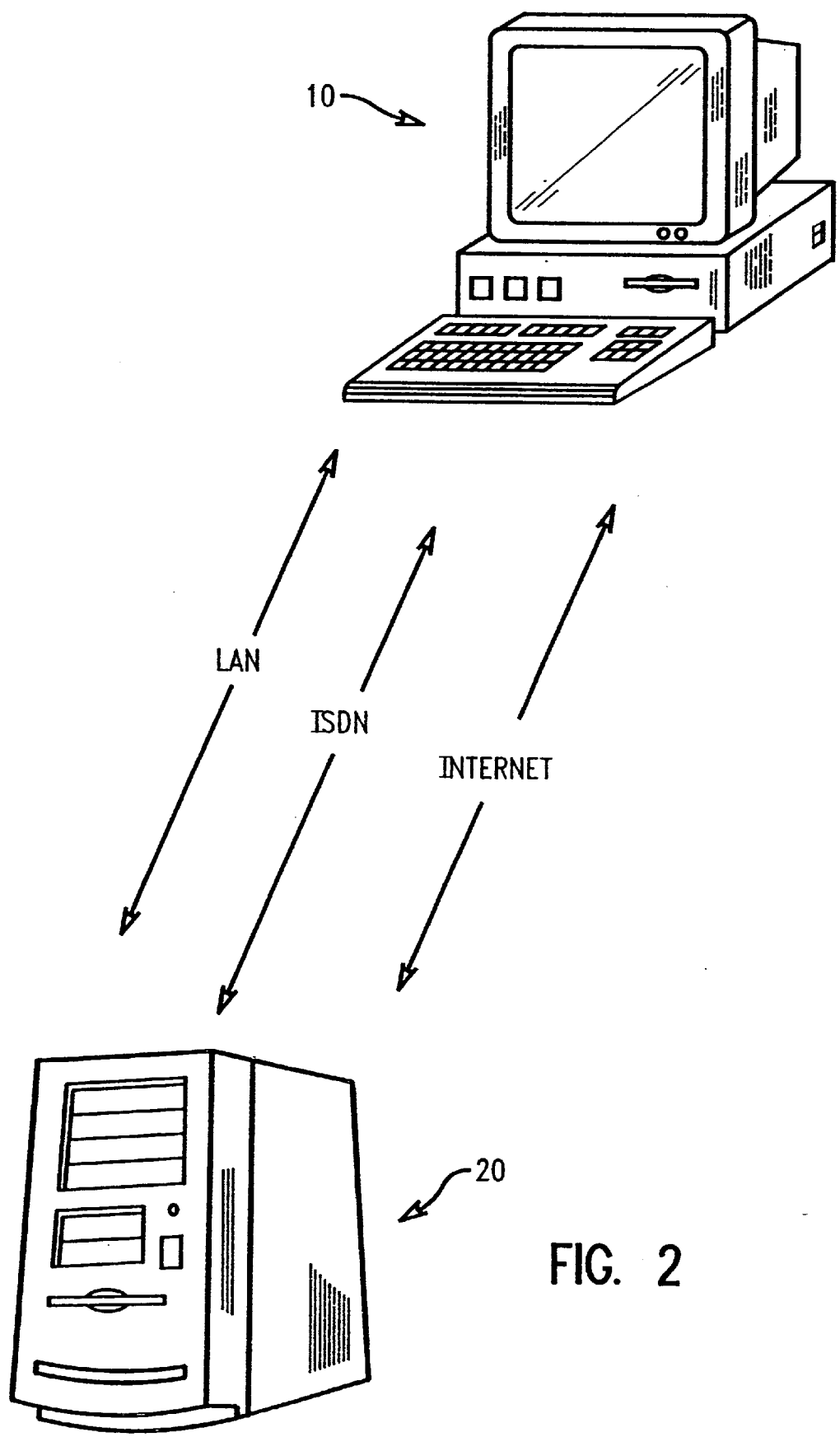
FIG. 2 is a schematic representation of how the client computer may be linked to a server.
Figure 3:
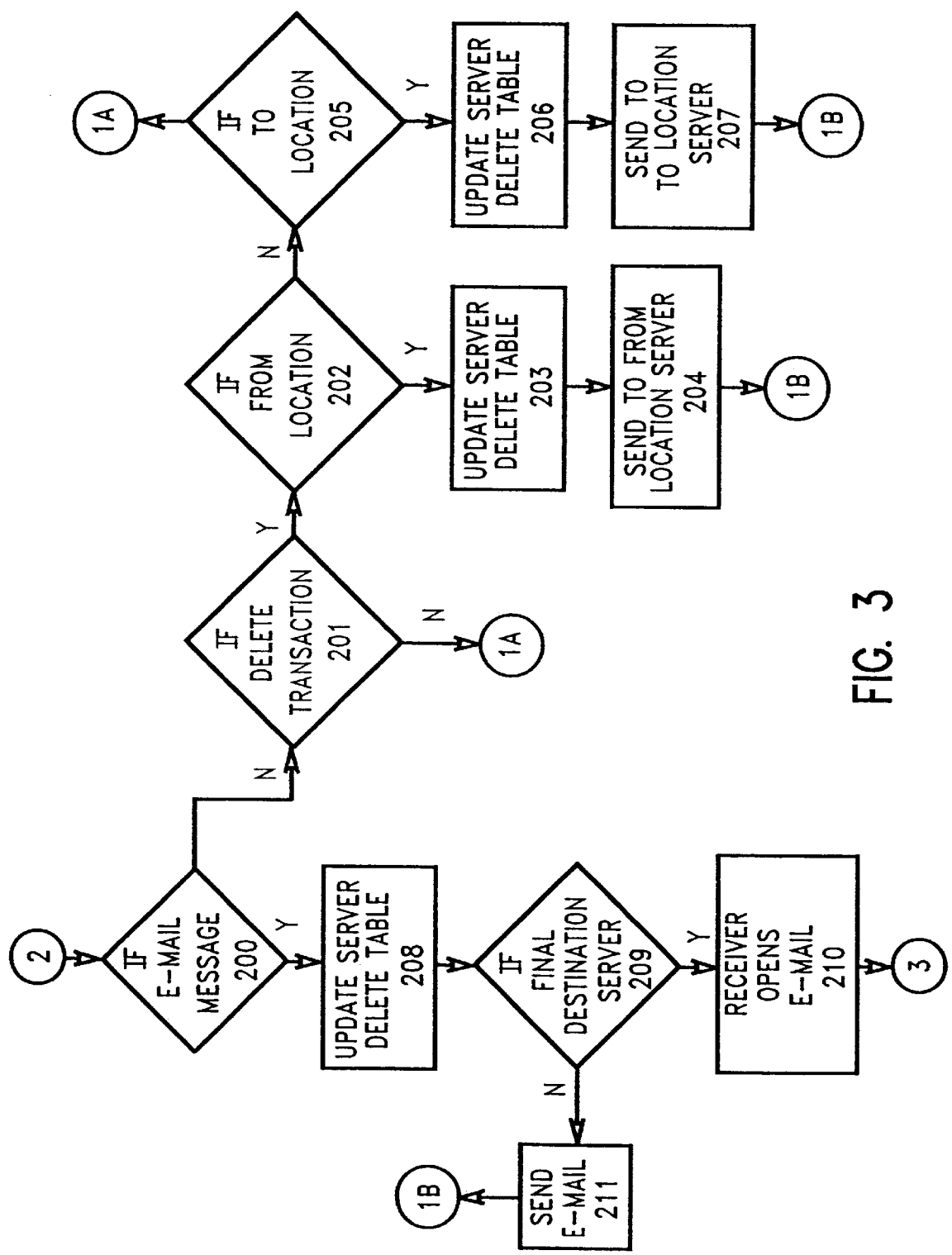
FIG. 3 is a flow diagram illustrating the method of creating an e-mail message which incorporates a deletion date within the message.
Figure 5:
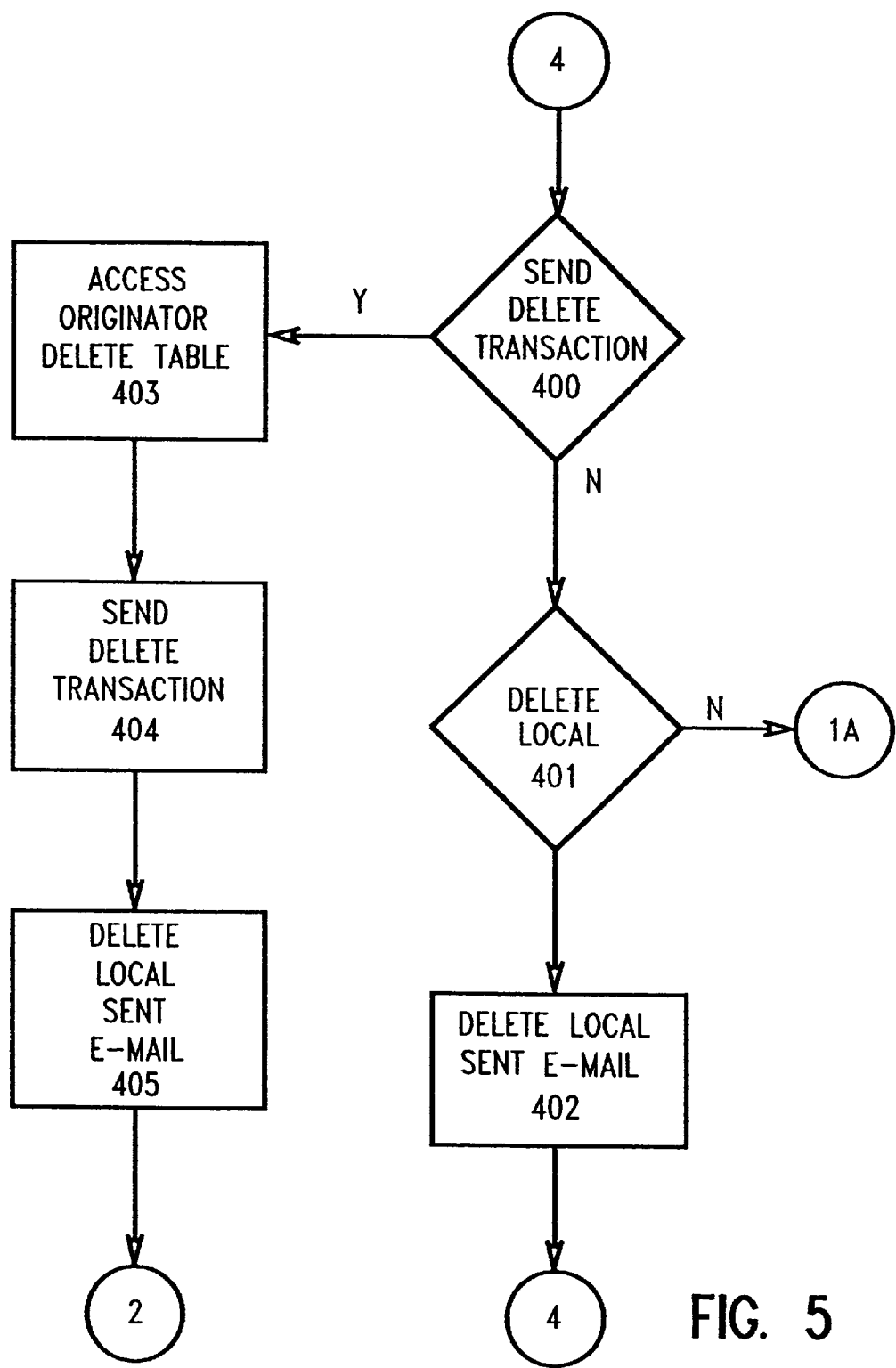
FIG. 5 is a flow diagram illustrating the method of deleting a previously sent e-mail message.

FIG. 1 is a flow diagram illustrating the process of creating an e-mail message in accordance with a method of the present invention. The process begins with the user turning on their client computer which is typically a personal computer 10 linked to a server 20, such as a local server or a LAN, a remote server either by telephone lines or specialized communication channels such as an Integrated Services Digital Network (ISDN), or interconnected via the Internet to other users as shown in FIG. 2. The user decides whether to create an e-mail message 101 or to create a delete transaction 102 to delete a previously sent e-mail message. If the user decides to create a delete transaction 102, FIG. 5 illustrates the sequence of events to delete a previously sent e-mail message. If the user decides to create the e-mail message, FIG. 3 illustrates the sequence of events to create an e-mail message which incorporates a deletion date within the message.

Initially, when an e-mail message is created, an originator delete table 70 is also created by the user as the originator of the message. The originator delete table shown in FIG. 7, which is maintained by the originator's client computer, preferably contains the message identifier and an address of the location to which the message is going. The message identifier consists of the originator's e-mail address together with a date and time stamp unique to the specific e-mail message. When the originator sends a delete transaction, the originator delete table 70 is accessed 403 and the delete transaction sent 404. The delete transaction consists of the message identifier, the direction indicator, the "from" location or the "to" location depending on the value stored in the direction indicator. The direction indicator has a value of "to" or "from" and indicates whether the delete transaction has been sent from the originator or the receiver of the e-mail message. The "from" location is the address of the last message server that sent the e-mail message while the "to" location is the address of the next message server that has or will receive the e-mail message. The e-mail message is deleted from the originator's client computer 405 along with all references to the message that was sent from the originator.

When the delete transaction is not sent by the originator, the originator may still choose whether or not to delete the e-mail message from the originator's client computer 401. If the originator decides not to delete the e-mail message, the originator then exits the sequence. If the originator decides to delete the e-mail message 402, then all references to the e-mail message are deleted from their client computer but may not be deleted from the servers which routed the message.

Returning back to the sequence of events in FIG. 1, the originator decides to create an e-mail message 103. The originator decides whether or not to indicate a deletion date 104 upon which the e-mail message is automatically deleted at the time of the deletion date from the originator's client computer and the servers which routed the message. If a deletion date is not indicated 109, the originator may still send the e-mail message and then decide to exit the entire process 110 or create another message 101.

When the originator indicates a deletion date in the e-mail message, a deletion date is placed in the header of the message 105. The client computer creates the originator delete table 106 which is updated when the e-mail message is sent from the originator's client computer 107. A message server then receives the e-mail message 108.

The message server may be either a gateway server or a final destination server. A gateway server sends the e-mail message from one server to another acting as a intermediary or may be the final destination server if there is only one server in the e-mail message route. The gateway server receives all the packets which make up the e-mail message and combines the packets to re-create the original message. If the gateway server is not the final destination server, the gateway server will breakdown the message into groups of one or more packets and sends the packets on to the next gateway server or the final destination server through a group of one or more routers.

Figure 8:
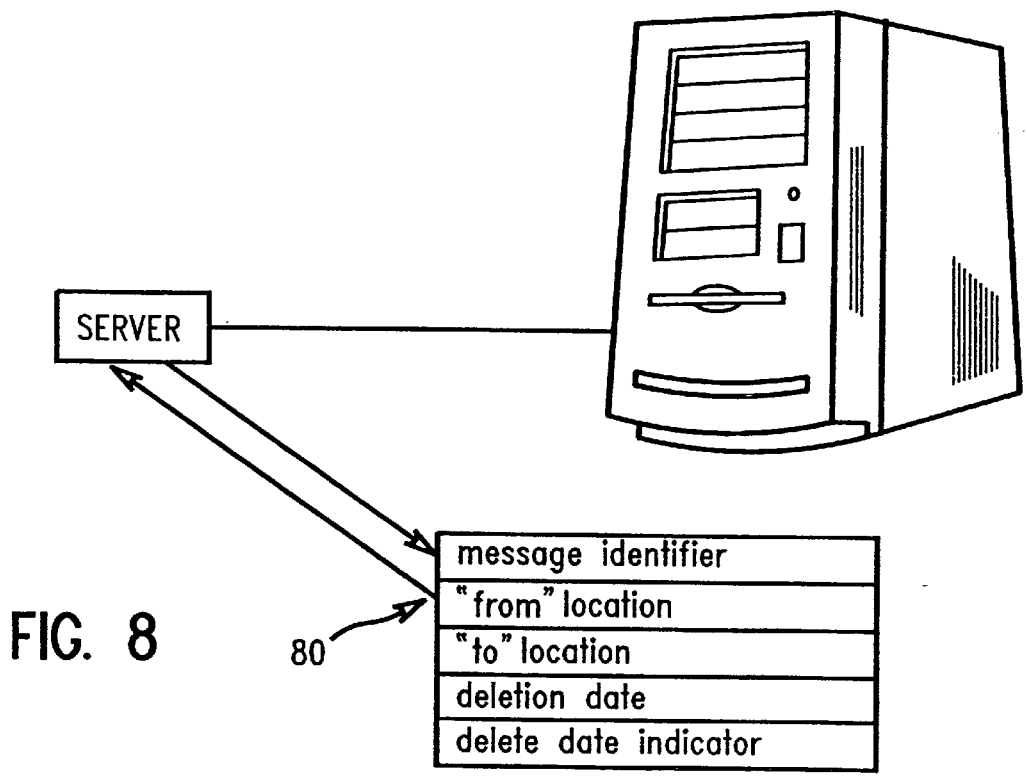
FIG. 8 is a schematic representation of a server delete table.
Figure 9:
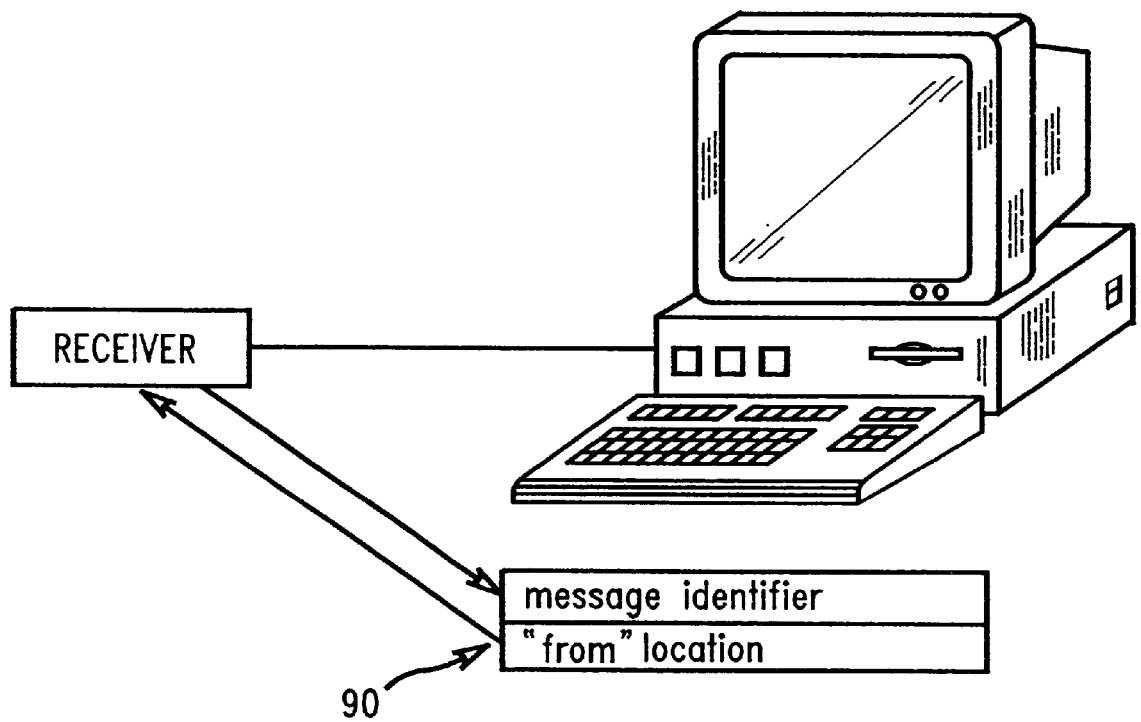
FIG. 9 is a schematic representation of a receiver delete table.

Upon receipt of the e-mail message by the message server, the server determines whether it has received an e-mail message 200 or if only a delete transaction was sent 201. When the server determines that an e-mail message has been received a server delete table 80, illustrated in FIG. 8, is created. Thus, every server which has routed an e-mail message containing a deletion date will have a server delete table 80. The server delete table 80, maintained by the server, contains the message identifier, the address of the next location which will receive the message (the "to" location), the address of the location which sent the message (the "from" location), the deletion date, and a delete date indicator. The delete date indicator has an initial value of "from" or "to" but upon deletion of the e-mail message, a value of "D" indicates that the message has been deleted. The server updates the server delete table 80 with the above mentioned information 208.

If the current message server is not the final destination server, the e-mail message is sent on to the next message server which may be another gateway server or the final destination server 211. Where the current message server is the final destination server 209, the receiver is alerted that an e-mail message has arrived and the receiver may access and read the message 210.

In situations where an e-mail message has not been received by the message server, the server determines whether a delete transaction has been received 201. If there is no delete transaction, the process is terminated. When a delete transaction has been detected by the server, it is determined whether the delete transaction is coming or going. When the delete transaction contains a delete indicator of "from" 202, the server then searches for the message identifier in the server delete table. The server delete table is updated 203 by deleting the e-mail message from the server memory storage and giving the deletion indicator a value of "D" to indicate that the e-mail message was deleted. The delete transaction is then sent to the "from location" in the server delete table 204 which then performs the same functions of updating that server delete table and changing the deletion indicator on the next server.

When the delete transaction contains a delete indicator of "to" 205, the server searches for the message identifier in the server delete table. If the message identifier is found, the server delete table is updated 206 and the e-mail message is deleted from the server memory storage. The deletion indicator is given a value of "D" to indicate that the message has been deleted. The delete transaction is then sent to the "to location" server 207 which then performs the same functions of updating the next server delete table and changing the deletion indicator on the next server.

Figure 4:
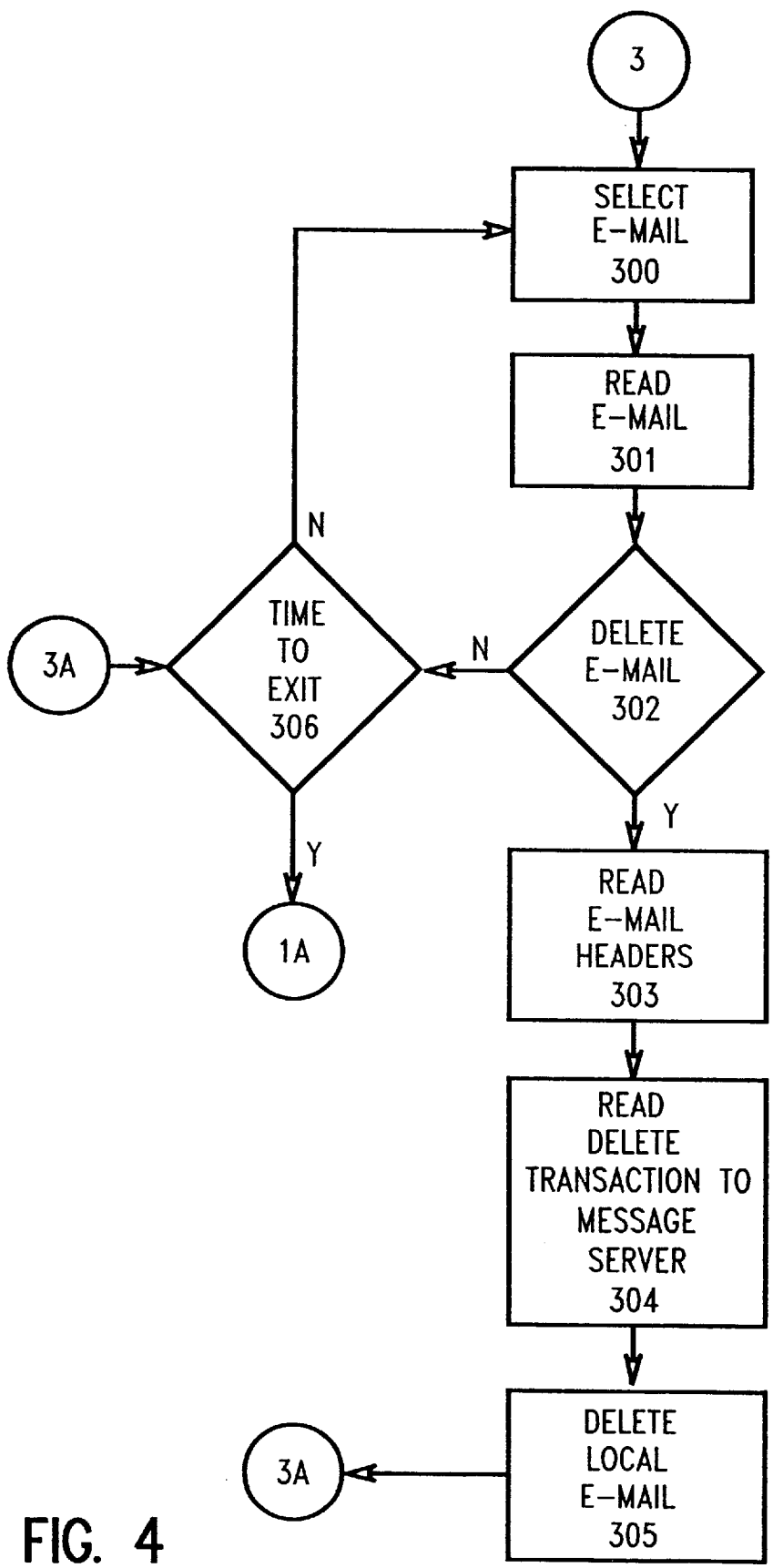
FIG. 4 is a flow diagram illustrating the method of deleting an e-mail message by a receiver of the message.

FIG. 4 illustrates a method of receiving and deleting e-mail messages received from the final destination server or e-mail messages that have already been received 300. The receiver client computer opens and reads the e-mail message 301 and creates a receiver delete table 90 shown in FIG. 9, which has an entry for every e-mail message received by the client computer. If the e-mail message has not been previously viewed, the receiver delete table 90 is updated with the message identifier and the address of the "from location." The receiver may then decide whether or not to delete the e-mail message 302. If the receiver chooses not to delete the message, the receiver determines whether to exit the process 306 and terminate the sequence of events or select another e-mail to view 300.

When the receiver decides to delete the e-mail message, the receiver's client computer reads the header information of the e-mail message to derive the message identifier 303. The receiver client computer accesses the receiver delete table 90 to obtain the "from location" then constructs and sends a delete transaction to the "from location" indicated on the receiver delete table 304. The e-mail message is deleted from the memory storage of the receiver's client 305 computer and the receiver determines whether to exit the process 306 and terminate the sequence of events or select another e-mail to view 300.

Figure 6:
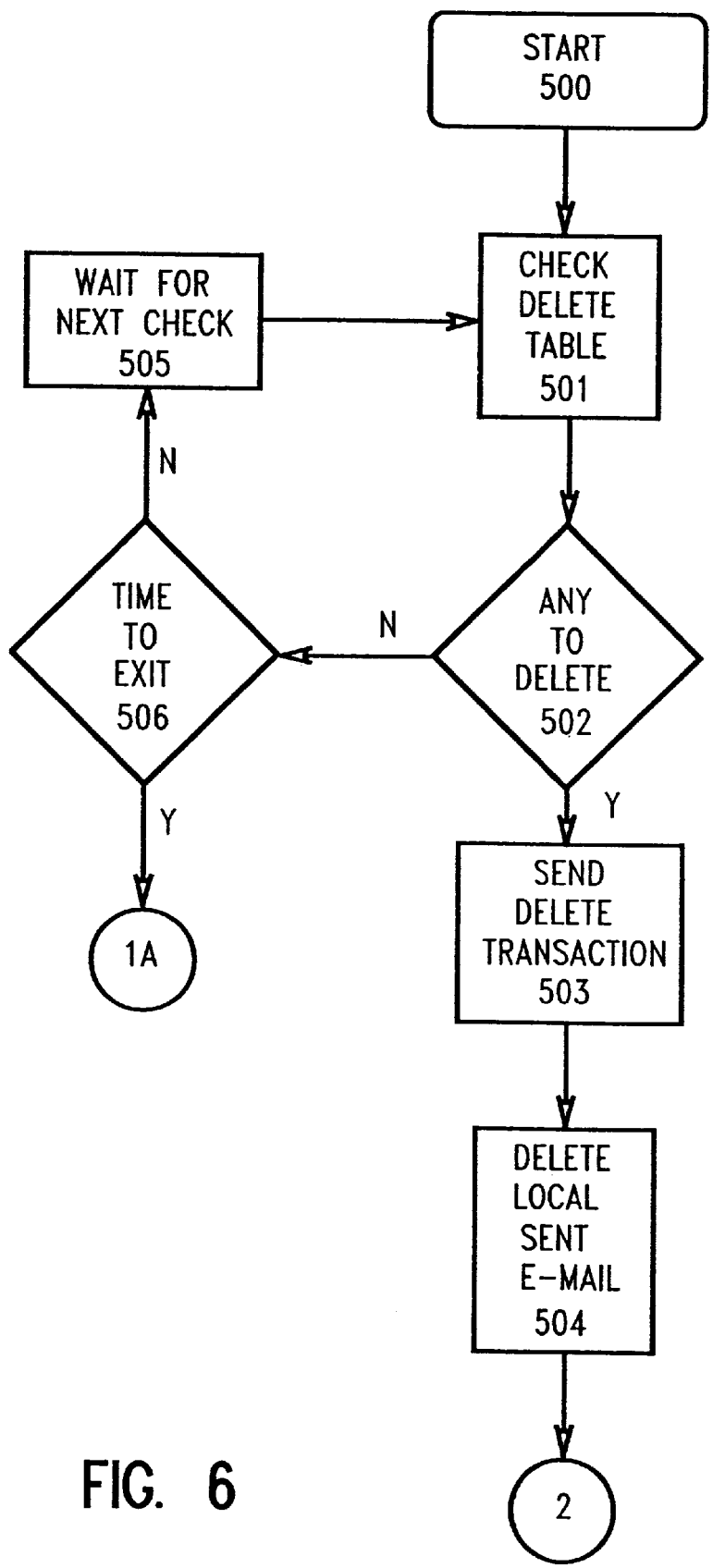
FIG. 6 is a flow diagram illustrating the method of automatically deleting an e-mail message from a server upon the occurrence of the deletion date.
Figure 7:
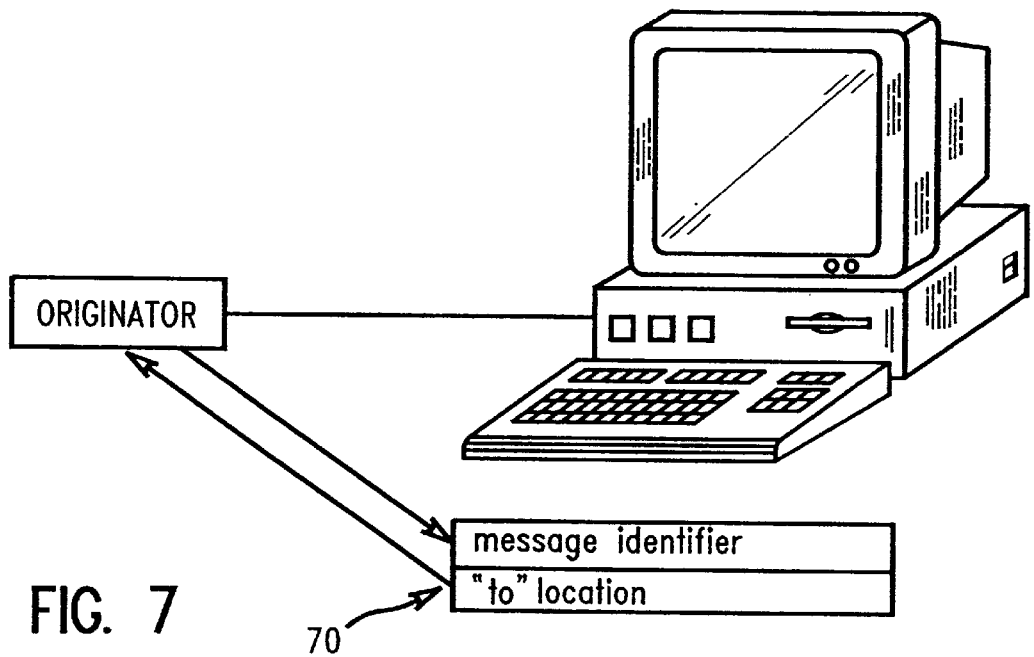
FIG. 7 is a schematic representation of an originator delete table.

A great advantage of the present invention is the ability to automatically delete the e-mail message from a server from a delete transaction sent by either the originator or receiver of the e-mail message. By the term "automatically," the server is really deleting the e-mail message upon the occurrence of a predetermined time or event previously specified in the server delete table. In FIG. 6, the server checks the server delete table periodically 501 to determine if there are any e-mail messages which need to be deleted 502. If there is an e-mail message which requires deletion upon occurrence of the deletion date, a delete transaction is sent to any servers which are listed with a "from location" and a "to location" 503. The e-mail message is then deleted from the server's storage memory 504 which starts the chain of events which occur when a delete transaction has been received by a message server in FIG. 3. If there are no messages to be deleted the server determines if it is time to exit the process 506. If the server does not exit the process, the server waits 505 and periodically checks to see if e-mail messages need to be deleted 501 from the server storage memory.

The present invention achieves the objects recited above by providing a method and apparatus for deleting e-mail messages on a client computer while also erasing the message from the server(s) which routed the message. By creating originator, server, and receiver delete tables, a pathway for a delete transaction containing the addresses of servers which routed the e-mail message enables the user, either an originator or receiver of the e-mail message, to sequentially delete the message along the pathway upon deletion from the client computer. Thus, e-mail message deleted from a client computer is also erased from the server(s) which routed the message.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An e-mail message having a deletion date in a header of the e-mail message and a delete table, the delete table comprising an e-mail message identifier and an address selected from the group consisting of (a) an address of a server to which an e-mail is adapted to be sent, (b) an address of a server from which an e-mail is adapted to be sent from, or (c) an address of a server to which an e-mail message is adapted to be sent and an address of a server from which an e-mail is adapted to be sent from.

2. A method of deleting e-mail messages sent to and received by a computer linked to a network comprising the steps of:
   (a) creating an e-mail message having a deletion date inserted in a header of the e-mail message,
   (b) sending the e-mail message with the deletion date from a computer along a server path having at least one server which routes said e-mail message to said computer;
   (c) receiving said e-mail message with the deletion date at each server along the server path; and
   (d) deleting the e-mail message with the deletion date such that upon deletion the e-mail message is deleted from all servers.

3. The method of claim 2 wherein in step (b) said server path comprises one or more servers in an intranet.

4. The method of claim 2 wherein in step (b) said server path comprises one or more servers in an internet.

5. The method of claim 2 wherein in step (b) said computer is a receiver of said e-mail message.

6. The method of claim 2 wherein in step (b) said computer is an originator of said e-mail message.

7. A method of deleting e-mail messages sent to and received by a computer linked to a network comprising the steps of:
   (a) creating a delete transaction within said e-mail message, the delete transaction comprising a server delete table containing an identifier for said e-mail message, an address of a location from which said e-mail was received along a server path having at least one server which routes said e-mail message to said computer, and an address of a location to which said e-mail is sent along the server path;
   (b) sending a delete transaction from said computer along the server path;
   (c) receiving said delete transaction at each server along the server path; and
   (d) executing said delete transaction by each server to delete said e-mail message sequentially along the server path.

8. The method of claim 7 wherein step (d) further includes sending the delete transaction sequentially along the server path.

9. The method of claim 1 wherein in step (a) said server path comprises one or more servers in an intranet.

10. The method of claim 1 wherein in step (a) said server path comprises one or more servers in an internet.

11. The method of claim 1 wherein in step (a) said computer is a receiver of said e-mail message.

12. The method of claim 1 wherein in step (a) said computer is an originator of said e-mail message.

13. The method of claim 7 further including the step of updating said server delete table.

14. A method of deleting an e-mail message from a server by an originator of the e-mail comprising the steps of:
   (a) creating a delete transaction within said e-mail message, the delete transaction comprising an originator delete table including an identifier for said e-mail message, and an address of a first server along a server path to which said e-mail message is sent;

(b) sending the delete transaction from the originator computer to a server path that routes the e-mail message from one or more servers to the originator computer upon the occurrence of step (a);

(c) receiving and executing said delete transaction by each server along the server path; and (d) deleting said e-mail message sequentially along the server path whereby the originator delete table is updated and sends the delete transaction to the first server along the server path.

15. The method of claim 14 wherein step (d) further includes sending the delete transaction sequentially along the server path.

16. The method of claim 14 further including the step of updating said originator delete table.

17. The method of claim 14 wherein in step (a) the server path comprises one server.

18. The method of claim 14 wherein in step (a) the server path comprises the Internet.

19. A method of deleting an e-mail message from a server by a receiver of the e-mail comprising the steps of:

(a) creating a delete transaction within said e-mail message, the delete transaction comprising a receiver delete table including an identifier for said e-mail message, and an address of a last server along a server path to which said e-mail message is sent;

(b) sending the delete transaction from the receiver computer to a server path that routes the e-mail message from one or more servers to the receiver computer upon the occurrence of step (a);

(c) receiving and executing said delete transaction by each server along the server path; and (d) deleting said e-mail message sequentially along the server path whereby the receiver delete table is updated and sends the delete transaction to the last server along the server path.

20. The method of claim 19 wherein step (c) further includes the step of sending the delete transaction to a next server along the server path.

21. The method of claim 19 wherein in step (a) the server path comprises one server.

22. The method of claim 19 wherein in step (a) the server path comprises the Internet.

23. A method of deleting an e-mail message by a server along a server path comprising the steps of:

(a) receiving, by said server, an e-mail message having a deletion date;

(b) creating a server delete table with an identifier of the e-mail message, an address of a location from which the e-mail message was received along the server path, and an address of a location to which the e-mail message is sent along the server path upon receipt of the e-mail message;

(c) deleting the e-mail message upon occurrence of the deletion date; and (d) updating said server delete table with an indicator indicating that the e-mail message has been deleted.

24. The method of claim 23 wherein said server comprises one of a plurality of servers along the server path and step (c) further includes the step of sending a delete transaction to the server from which the e-mail was received along the server path.

25. The method of claim 23 wherein said server comprises one of a plurality of servers along the server path and step (c) further includes the step of sending the delete transaction to the server to which the e-mail is sent to along the server path.

26. A method of creating and deleting e-mail comprising the steps of:

(a) creating an e-mail message on a first client computer;

(b) inserting a deletion date into a header of the e-mail message;

(c) sending the e-mail message with the deletion date to one or more servers in a chain of gateway servers;

(d) sending the e-mail message with the deletion date, by a gateway server, to a final destination server;

(e) receiving the e-mail message with the deletion date, by a second client computer, from the final destination server; and (f) deleting the e-mail message with the deletion date such that upon deletion the e-mail message is deleted from all servers.

27. The method of claim 26 wherein step (f) comprises deleting, from the second client computer, the e-mail message with the deletion date such that upon deletion a delete transaction is sent from the second client computer to the final destination server sequentially to a first gateway server which received the e-mail message from the first client computer.

28. The method of claim 26 wherein step (f) comprises deleting, from the first client computer, the e-mail message with the deletion date from all servers by sending a delete transaction from the first client computer sequentially to all gateway servers and the final destination server.

29. The method of claim 26 wherein in steps (c) and (d) the chain of gateway servers comprises one gateway server which serves as the final destination server.

30. A method of creating and utilizing an e-mail message delete table comprising the steps of:

(a) creating an e-mail message on a client computer;

(b) creating an e-mail message delete table comprising an e-mail message identifier, and at least one address selected from (i) a location to which said e-mail message is to be sent or (ii) a location from which said e-mail message was sent from;

(c) updating said e-mail message delete table in response to a delete transaction; and (d) indicating on said e-mail message delete table that said e-mail message has been deleted.

31. The method of claim 30 wherein (i) said e-mail message delete table is located on the client computer of step (a), (ii) said address in step (b) is a location to which said e-mail message is to be sent, and (iii) said updating of step (c) occurs when said delete transaction is sent from said client computer.

32. The method of claim 31 wherein in step (c) the delete transaction is sent from the client computer upon deleting said e-mail message from the client computer.

33. The method of claim 30 wherein (i) said computer of step (a) is an originator client computer, (ii) said method further comprises a step of sending said e-mail message to a receiver client computer between steps (a) and (b), (iii) said e-mail message delete table is located on the receiver client computer, (iv) said address in step (b) is a location to which said e-mail message was sent from, and (v) said updating of step (c) occurs when said delete transaction is sent from said receiver client computer.

34. The method of claim 33 wherein in step (c) the delete transaction is sent from the receiver client computer upon deleting said e-mail message from the receiver client computer.

35. The method of claim 30 wherein (i) said computer of step (a) is an originator client computer, (ii) said method further comprises a step of providing a server linked to said originator client computer and/or to a receiver client computer before step (b), (iii) said e-mail message delete table is located on the server, (iv) said table contains both an address location to which said e-mail message is to be sent and an address location from which said e-mail message was sent from, and (v) said updating of step (c) occurs when said delete transaction is received by said server from said originator client computer or from said receiver client computer.

36. The method of claim 35 wherein in step (c) said server stores said delete transaction and is adapted to update said server delete table upon occurrence of a deletion date listed in the delete transaction.

37. A program storage device readable by a machine, tangibly embodying a program of instructions executable by the machine to perform method steps for a method of deleting e-mail messages sent to and/or received by a computer linked to a network, said method steps comprising:
  (a) deleting an e-mail message from a computer, said computer linked to a server path which routes said e-mail message to said computer;
  (b) sending a delete table from said computer to the server path, the delete table selected from the group consisting of an originator delete table, a server delete table and a receiver delete table;
  (c) receiving and executing said delete table by each server along the server path; and
  (d) deleting said e-mail message sequentially along the server path.

38. The program storage device of claim 37 wherein: (i) said e-mail message has a incorporated therein a delete transaction, (ii) said computer of step (a) is an originator of the e-mail message, (iii) said server path routes said e-mail message from one or more servers to the originator computer, and (iv) said computer in step (b) is said originator computer.

39. The program storage device of claim 37 wherein: (i) said e-mail message has a incorporated therein a delete transaction, (ii) said computer of step (a) is a receiver of the e-mail message, (iii) said server path routes said e-mail message from one or more servers to the receiver computer, and (iv) said computer in step (b) is said receiver computer.

40. A program storage device readable by a machine, tangibly embodying a program of instruction executable by the machine to perform method steps for a method of deleting an e-mail message by a server along a server path, said method steps comprising:
  (a) receiving, by said server, an e-mail message having a deletion date;
  (b) creating a server delete table with an identifier of the e-mail message, an address of a location from which the e-mail message was received along the server path, and an address of a location to which the e-mail message is sent along the server path upon receipt of the e-mail message;
  (c) deleting the e-mail message upon occurrence of the deletion date; and
  (d) updating said server delete table with an indicator indicating that the e-mail message has been deleted.

41. A program storage device readable by a machine, tangibly embodying a program of instruction executable by the machine to perform method steps for a method of creating and deleting e-mail, said method steps comprising:
  (a) creating an e-mail message on a first client computer;
  (b) inserting a deletion date into a header of the e-mail message;
  (c) sending the e-mail message with the deletion date to one or more servers in a chain of gateway servers;
  (d) sending the e-mail message with the deletion date, by a gateway server, to a final destination server;
  (e) receiving the e-mail message with the deletion date, by a second client computer, from the final destination server; and
  (f) deleting the e-mail message with the deletion date such that upon deletion the e-mail message is deleted from all servers.

42. A program storage device readable by a machine, tangibly embodying a program of instruction executable by the machine to perform method steps for a method of creating and utilizing an originator delete table, said method steps comprising:
  (a) creating an e-mail message on a client computer;
  (b) creating an originator delete table on the client computer comprising an e-mail message identifier, an address of a location to which said e-mail message is to be sent;
  (c) updating said originator delete table when a delete transaction is sent from the client computer; and
  (d) indicating on said originator delete table that said e-mail message has been deleted.

43. A program storage device readable by a machine, tangibly embodying a program of instruction executable by the machine to perform method steps for a method of creating and utilizing a receiver delete table, said method steps comprising:
  (a) creating an e-mail message on an originator client computer;
  (b) sending said e-mail message to a receiver client computer;
  (c) creating a receiver delete table on the receiver client computer comprising an e-mail message identifier and an address of the server from which said e-mail message was sent from;
  (d) updating said receiver delete table when a delete transaction is sent from the receiver client computer; and
  (e) indicating on said receiver delete table that said e-mail message has been deleted.

44. A program storage device readable by a machine, tangibly embodying a program of instruction executable by the machine to perform method steps for a method of creating and utilizing a server delete table, said method steps comprising:
  (a) providing a server linked to a receiver computer, an originator computer, or both;
  (b) creating a server delete table when a server has received or sent an e-mail message, said server delete table comprising an e-mail message identifier and an address of a server from which said e-mail message was sent from and an address of a server to which said e-mail message will be sent;
  (c) updating said server delete table when a delete transaction, received by the server, is from a receiver client or an originator client computer;

(d) indicating on said server delete table that said e-mail message has been deleted.

45. A program storage device readable by a machine having access to a delete table, the delete table comprising an e-mail message identifier, an address of a server to which an e-mail message is adapted to be sent and an address of a server from which an e-mail is adapted to be sent from, tangibly embodying a program of instructions to perform method steps for a method of deleting an e-mail message, the method comprising the steps of:

(a) checking the delete table for the e-mail message identifier after receiving instructions from a user to delete an e-mail message having the message identifier;

(b) locating the message identifier in the delete table;

(c) deleting the message identifier from the delete table;

(d) deleting the e-mail message from the machine; and (e) sending a delete transaction from the machine to all addresses on the delete table for the e-mail message.

46. The program storage device of claim 45 wherein the program of instructions to perform method steps for a method of deleting an e-mail message further includes the step of indicating on the delete table that the e-mail message has been deleted.

\* \* \* \* \*